(12) United States Patent
Behnken

(10) Patent No.: US 9,362,028 B2
(45) Date of Patent: Jun. 7, 2016

(54) COMBINATION INSULATOR COVER

(71) Applicant: Custom Coating Innovations, Inc., Lebanon, IL (US)

(72) Inventor: Joe Ralph Behnken, O'Fallon, IL (US)

(73) Assignee: Custom Coating Innovations, Inc., Lebanon, IL (US)

( * ) Notice: Subject to any disclaimer, the term of this patent is extended or adjusted under 35 U.S.C. 154(b) by 22 days.

(21) Appl. No.: 14/459,712

(22) Filed: Aug. 14, 2014

(65) Prior Publication Data

US 2015/0047896 A1   Feb. 19, 2015

Related U.S. Application Data

(60) Provisional application No. 61/866,473, filed on Aug. 15, 2013.

(51) Int. Cl.
*H01B 17/00* (2006.01)
*H02G 1/02* (2006.01)

(52) U.S. Cl.
CPC . *H01B 17/00* (2013.01); *H02G 1/02* (2013.01)

(58) Field of Classification Search
CPC ........... H01B 17/00; H01B 17/58; H02G 1/02
USPC ...................................................... 174/137 R
See application file for complete search history.

(56) References Cited

U.S. PATENT DOCUMENTS

| | | | |
|---|---|---|---|
| 3,054,704 A | 9/1962 | Ruoff | |
| 3,835,238 A * | 9/1974 | West | 174/5 R |
| 3,966,294 A | 6/1976 | Benton | |
| 4,097,108 A | 6/1978 | Prodel | |
| 4,127,315 A | 11/1978 | McKee | |
| 4,127,316 A | 11/1978 | McKee et al. | |
| 4,660,909 A | 4/1987 | Wilson | |
| 6,142,434 A | 11/2000 | Trost et al. | |
| 8,324,504 B2 | 12/2012 | Grenier | |

* cited by examiner

*Primary Examiner* — Dhirubhai R Patel
(74) *Attorney, Agent, or Firm* — Armstrong Teasdale LLP

(57) ABSTRACT

A method and system for a combination insulator cover configured to fit a plurality of insulator cable clamp devices are provided. The cover includes a dome configured to receive an insulator top and a plurality of cable cavities that extend orthogonally away from the dome in opposite directions. The plurality of cable cavities are configured to permit passage of a cable therethrough, the cable cavities include a first cylindrically shaped portion and a second cylindrically-shaped portion, first cylindrically shaped portion being larger than a diameter of second cylindrically-shaped portion. The cover also includes a lower extension that extends along a bottom edge of said cover from a distal end of said second cylindrically-shaped portion to a distal end of the opposite second cylindrically-shaped portion, said lower extension is split parallel to the plurality of cable cavities.

9 Claims, 10 Drawing Sheets

COMBINATION INSULATOR COVER

BACKGROUND OF THE DISCLOSURE

This description relates to insulator covers, and, more particularly, to a combination insulator cover including covering cavities to accommodate a plurality of differently-shaped insulator models.

Insulator covers are commonly used to ensure isolation of animals and humans from high-voltage electrical components, such as, but not limited to electrical switchyard and transmission and distribution equipment. Insulators may be replaced at intervals for maintenance, repair, upgrade, or obsolescence. The replacement insulator may not have the same dimensions or configuration of previously installed insulators. Accordingly, equipment that interfaces with the insulator may also need to be changed during a replacement of an insulator. Such additional replacement may lead to additional unnecessary costs associated with the replacement.

Moreover, a user, such as, a utility may have many insulators in their fleet of electrical equipment, such as many hundreds or thousands of insulators. The insulators may have been installed over a period of many years, meaning the insulators are not all identical. It would therefore be desirable to have insulator covers that can be used on a plurality of different non-identical insulator models to reduce the inventory needs of the utility.

BRIEF DESCRIPTION OF THE DISCLOSURE

In one embodiment, a method and system for a combination insulator cover configured to fit a plurality of insulator cable clamp devices includes a dome configured to receive an insulator top, a plurality of flared cavities configured to receive the flukes of a top portion of the insulator, a plurality of cable cavities that extend orthogonally away from dome in opposite directions, a clip cavity configured to receive a clip attached to the cable positioned at a distal end of second cylindrically-shaped portions, a lower extension extends along a bottom edge of the cover from a distal end of the second cylindrically-shaped portion to second cylindrically-shaped portion, a hotstick knob extending upwardly from dome to permit a user to handle the cover using a hotstick, a bolt cavity configured to receive one or more cable clamp bolts used to clamp the cable into the insulator using the clamp top type cable clamp device.

In another embodiment, a combination insulator cover configured to fit a plurality of different style insulator cable clamp devices includes a dome configured to receive an upper portion of an electrical insulator, a first cable cavity that extends orthogonally away from the dome in a first direction and is configured to permit passage of a cable therethrough, and a second cable cavity that extends away from the dome in a second direction and configured to permit passage of a cable therethrough, the second direction being opposite the first direction, at least one of the first cable cavity and the second cable cavity. The first and second cable cavities each include a first cylindrically shaped portion; and a second cylindrically-shaped portion, a diameter of the first cylindrically shaped portion being larger than a diameter of the second cylindrically-shaped portion. The combination insulator cover further includes a lower extension that extends along a bottom edge of the cover from a distal end of the second cylindrically-shaped portion to a distal end of the opposite second cylindrically-shaped portion, the lower extension is split parallel to the plurality of cable cavities to permit the insulator cover to be slid down over a fully assembled insulator and cable attachment and a plurality of flared cavities extending from the dome and configured to receive flukes of a top portion of the insulator.

In still another aspect, a combination insulator cover configured to fit a plurality of different style insulator cable clamp devices includes a dome configured to receive an insulator top and a plurality of cable cavities that extend orthogonally away from dome in opposite directions. The plurality of cable cavities are configured to permit passage of a cable therethrough. The plurality of cable cavities each includes a first cylindrically shaped portion, and a frusto-conically-shaped portion permitting a transition to a second cylindrically-shaped portion. The first cylindrically shaped portion being larger than a diameter of second cylindrically-shaped portion. The combination insulator cover further includes a clip cavity configured to receive a clip attached to the cable positioned at a distal end of second cylindrically-shaped portions and a lower extension that extends along a bottom edge of the cover from a distal end of the second cylindrically-shaped portion to second cylindrically-shaped portion. The lower extension is split parallel to the plurality of cable cavities to permit cover to be slid down over a fully assembled insulator and cable attachment. The lower extension includes flared openings that extend outwardly to facilitate sliding cover over the cable. The combination insulator cover also includes a hot-stick knob extending upwardly from dome to permit a user to handle the cover using a hotstick and a bolt cavity configured to receive one or more cable clamp bolts used to clamp the cable into the insulator using the clamp top type cable clamp device.

BRIEF DESCRIPTION OF THE DRAWINGS

FIGS. 1-10 show exemplary embodiments of the method and system described herein.

FIG. 1 is a front elevation view of a combination insulator cover configured for installation on a plurality of different electrical insulator assemblies.

FIG. 2 is a side view of cover in accordance with an example embodiment of the present disclosure.

FIG. 3 is a top view, looking down on cover in accordance with an example embodiment of the present disclosure.

FIG. 4 is a perspective view of cover in accordance with an example embodiment of the present disclosure.

FIG. 7 is a side elevation view of vice top type insulator cable clamp device mounted in a side projecting configuration rather than the vertical configuration shown in FIGS. 5A and 5B.

FIG. 8 is a perspective view of vice top type insulator cable clamp device 500 mounted in a vertical configuration.

FIG. 9 is a side elevation view of vice top type insulator cable clamp device 500.

FIG. 10 is a perspective view of vice top type insulator cable clamp device 500.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE DISCLOSURE

The following detailed description illustrates embodiments of the disclosure by way of example and not by way of limitation. It is contemplated that the disclosure has general application to electrical insulators in industrial, commercial, and residential applications.

The following description refers to the accompanying drawings, in which, in the absence of a contrary representation, the same numbers in different drawings represent similar elements.

Figure 1:
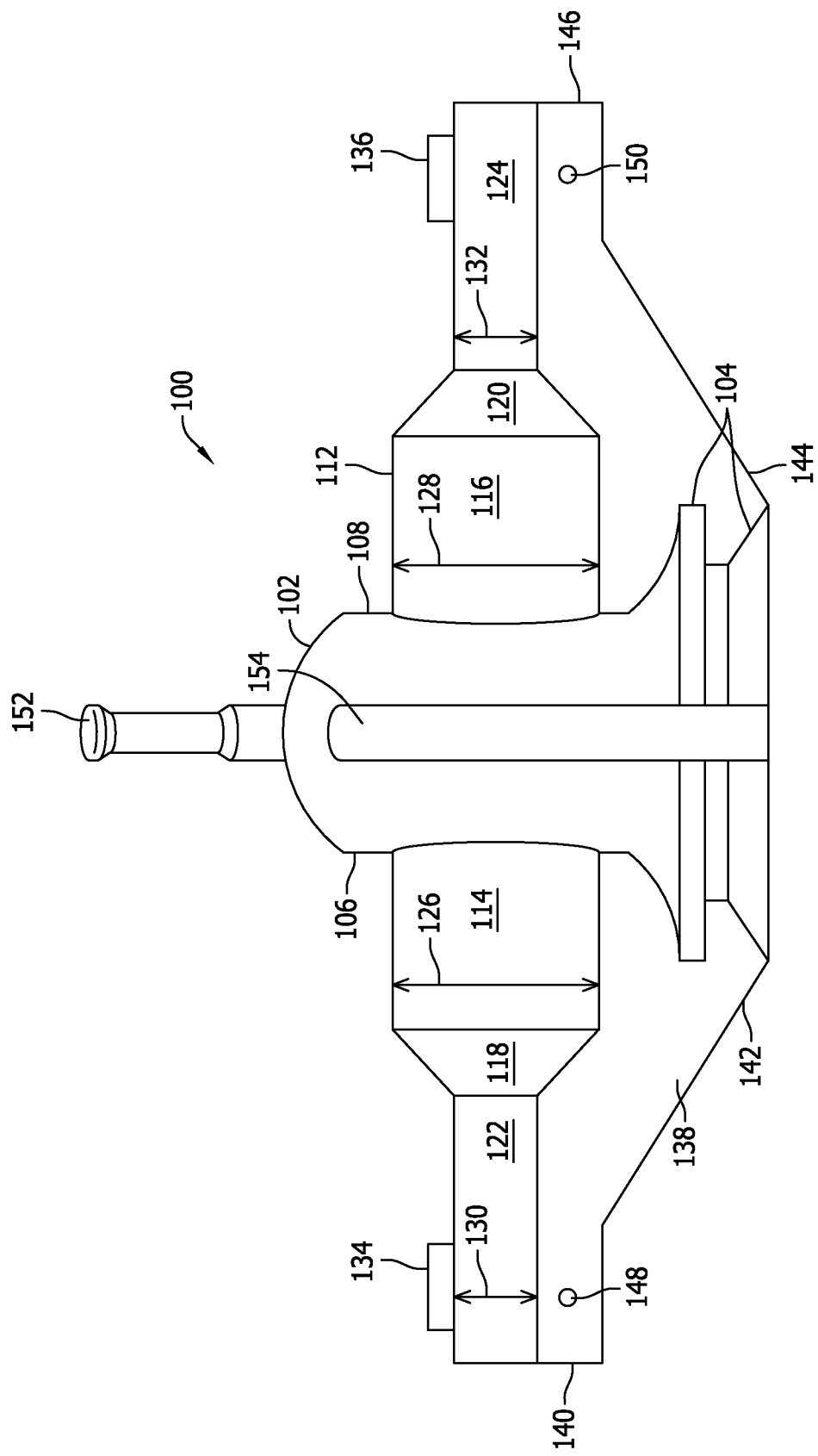

FIG. 1 is a front elevation view of a combination insulator cover 100 configured for installation on a plurality of different electrical insulator assemblies (not shown in FIG. 1). In the example embodiment, cover 100 is configured to fit a plurality of cable clamp devices, which are installed on an upper extent of the insulator. The cable clamp devices may include, for example, a vice top cable clamp device (not shown in FIG. 1) or a clamp top cable clamp device (not shown in FIG. 1). Features of the vice top cable clamp device and the clamp top cable clamp device may not be found on each other insulator, so accommodations to the cover are made to complementarily match the dimensions and locations of the features of both types of insulator cable clamp devices in a single cover 100.

Cover 100 includes a dome 102 configured to receive an insulator top (not shown in FIG. 1), which includes a respective one of the cable clamp device types. Cover 100 may also include one or more flared cavities 104 configured to receive the flukes of a top portion of the insulator. Coupled to opposing sides 106, 108 of dome 102 are similarly shaped cable cavities 110, 112. Cable cavities 110, 112 extend generally orthogonally away from dome 102 in opposite directions and are configured to permit passage of a cable (not shown in FIG. 1) therethrough. In one embodiment, cable cavities 110, 112 include a first cylindrically shaped portion 114, 116, a frusto-conically-shaped portion 118, 120 permitting a transition to a second cylindrically-shaped portion 122, 124. A diameter 126, 128 of first cylindrically shaped portion 114, 116 is larger than a diameter 130, 132 of second cylindrically-shaped portion 122, 124.

A distal end of second cylindrically-shaped portions 122, 124 includes a clip cavity 134, 136 configured to receive a clip (not shown in FIG. 1) attached to the cable.

A lower extension 138 of cover 100 extends along a bottom edge of cover 100 from a distal end of second cylindrically-shaped portion 122 to second cylindrically-shaped portion 124. Lower extension 138 may extend a lesser distance than the entire distance of cover 100 end-to-end. Lower extension 138 is split parallel to cable cavities 110, 112 to permit cover 100 to be slid down over a fully assembled insulator and cable attachment. To facilitate installation, in addition to being split, lower extension 138 includes flared openings 140, 142, 144, and 146. Flared openings 140, 142, 144, and 146 extend outwardly slightly to facilitate sliding cover 100 over the cable. Typically, the distance that flared openings 140, 142, 144, and 146 are split is determined by a cable diameter here the distance is slightly less than the diameter. An aperture 148, 150 positioned between second cylindrically-shaped portion 122, 124 and flared openings 140, 146 permits insertion of a fastener to facilitate maintaining cover 100 installed on cover 100 during, for example, during increment weather and/or windy conditions.

Cover 100 includes a hotstick knob 152 extending upwardly from dome 102 to permit a user such as, a lineman to handle cover 100 using a hotstick or other lineman's handling tool.

Cover 100 also includes a bolt cavity 154 configured to receive one or more cable clamp bolts used to clamp the cable into the insulator using the clamp top type cable clamp device.

Cover 100 is formed of a resilient and flexible material, such as many forms of plastic materials, including but not limited to high density polyethylene configured to provide dielectric strength and puncture resistance. The plastic material is configured to permit operation of cover 100 in temperatures of 50° F. to 170° F. Ultra-violet stabilizers in the material facilitate inhibiting degradation as a result of atmospheric exposure.

In various embodiments, the clamp top type cable clamp device may be embodied in a Clamps Top conductor clamp such as distributed by the Lindsey Manufacturing Company, Azuza, Calif. The vice top type cable clamp may be embodied in a Vise Top pin insulator distributed by Hendrix Molded Products of Amherst, N.H.

Figure 2:
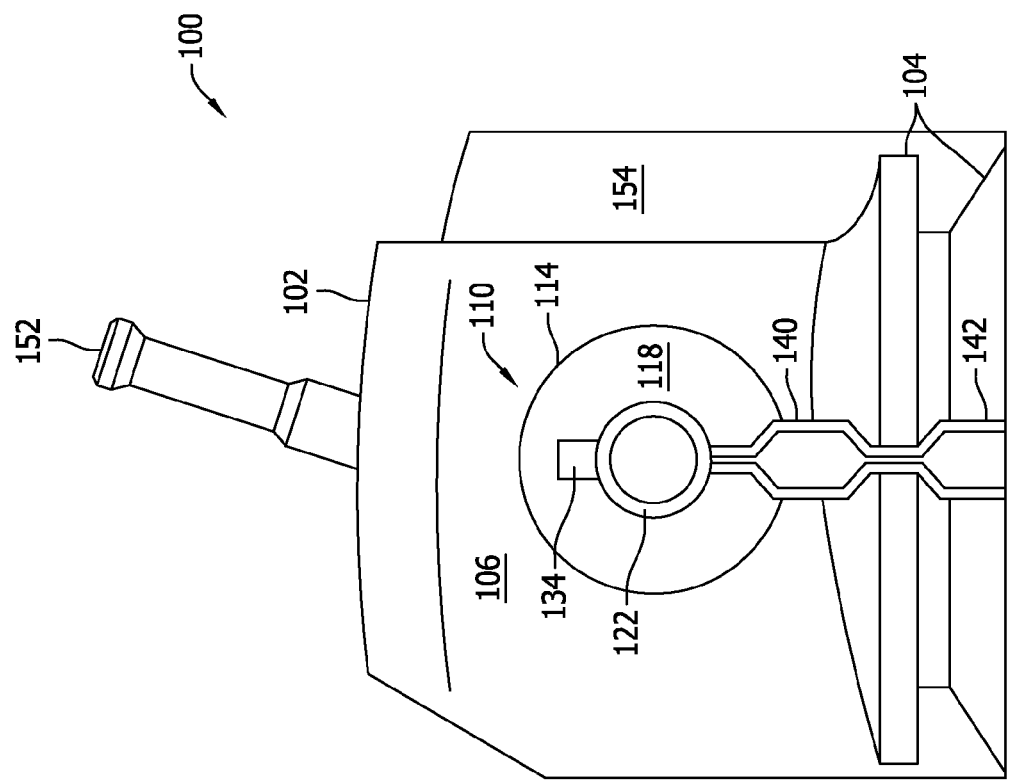

FIG. 2 is a side view of cover 100 in accordance with an example embodiment of the present disclosure.

Figure 3:
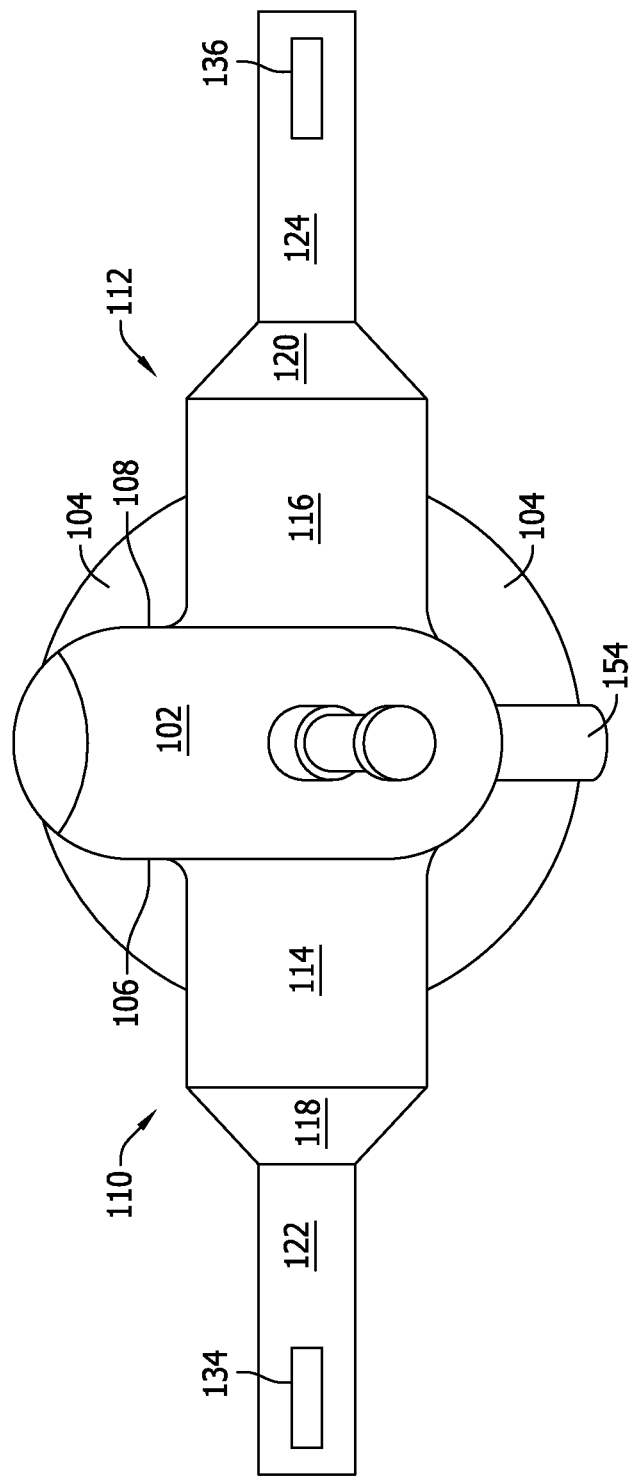

FIG. 3 is a top view, looking down on cover 100 in accordance with an example embodiment of the present disclosure.

Figure 4:
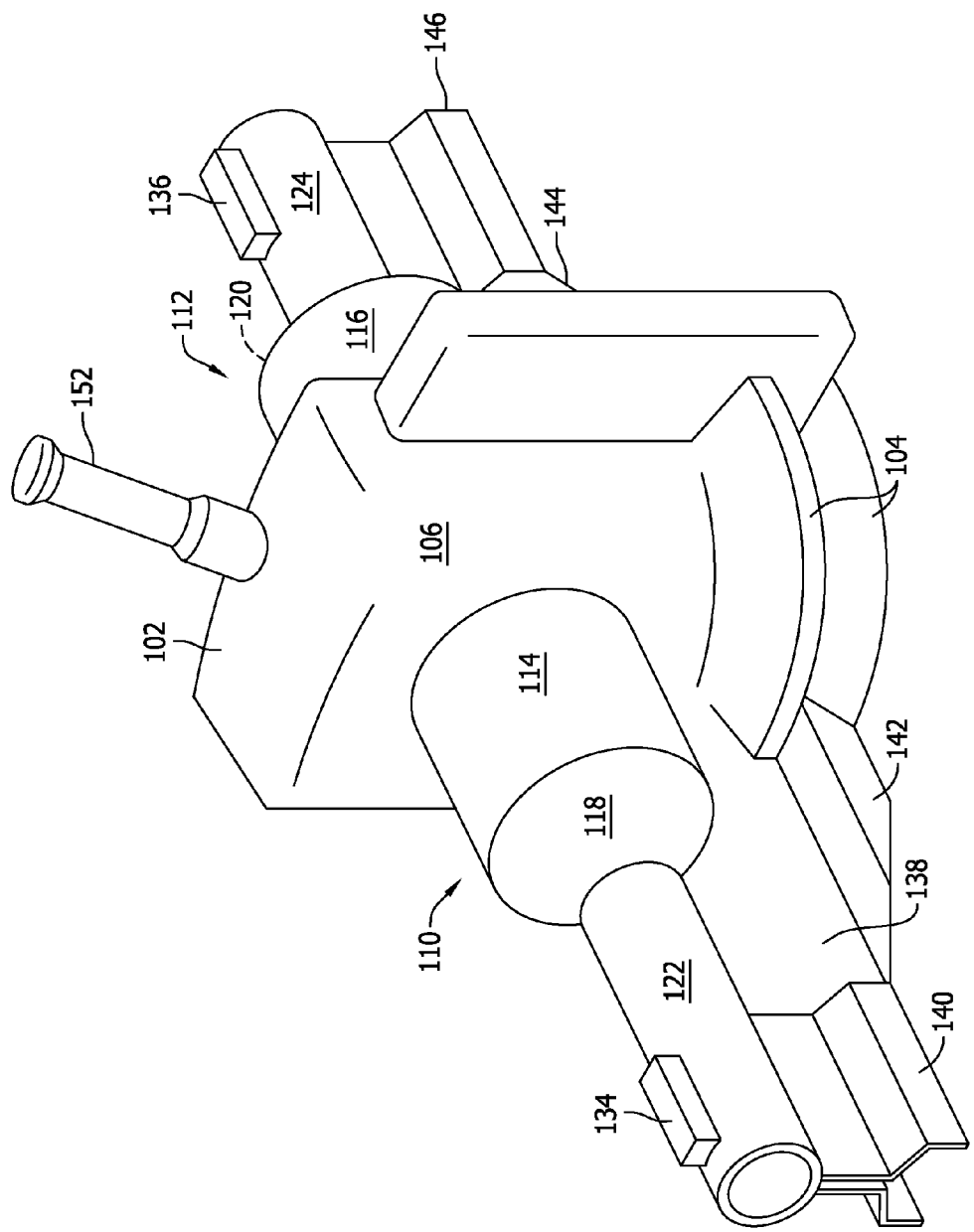

FIG. 4 is a perspective view of cover 100 in accordance with an example embodiment of the present disclosure.

Figure 5A:
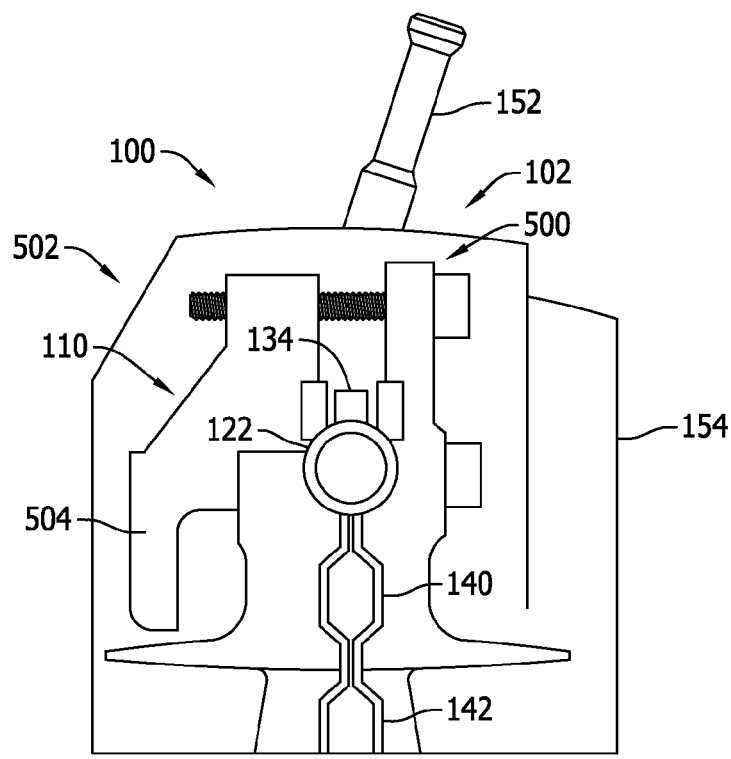
FIG. 5A is a side elevation view of cover installed on a vice top type insulator cable clamp device.
Figure 5B:
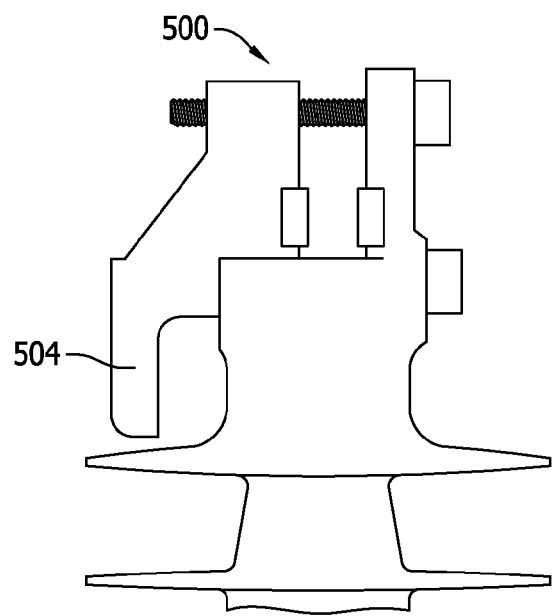
FIG. 5B is a side elevation view of vice top type insulator cable clamp device.

FIG. 5A is a side elevation view of cover 100 installed on a vice top type insulator cable clamp device 500. FIG. 5B is a side elevation view of vice top type insulator cable clamp device 500. As can be seen in FIG. 5A, bolt cavity 154 is not used for the insulator having a clamp top type cable clamp device. However, dome 102 is expanded on an opposite side 502 to accommodate a vertical finger 504 of vice top type insulator cable clamp device 500. Bolt cavity 154 is sized to accommodate fasteners on a vice top type cable clamp device (not shown in FIG. 5). Vise top insulators incorporate a clamping mechanism into the top of the insulator to provide quick and easy conductor installation without the need for additional tie products.

Figure 6A:
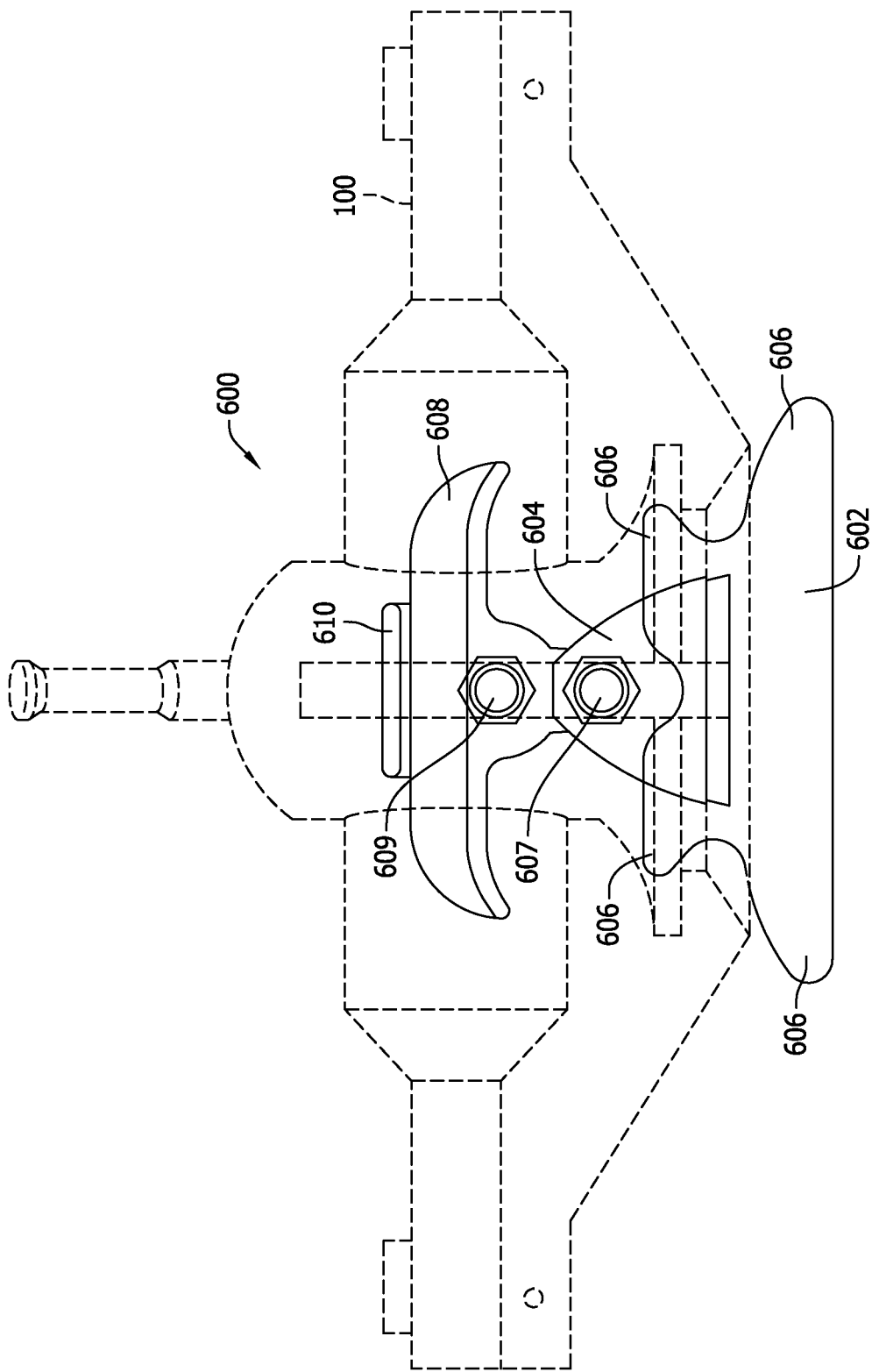
FIG. 6A is a side elevation view of a clamp top type cable clamp device as installed on an insulator.
Figure 6B:
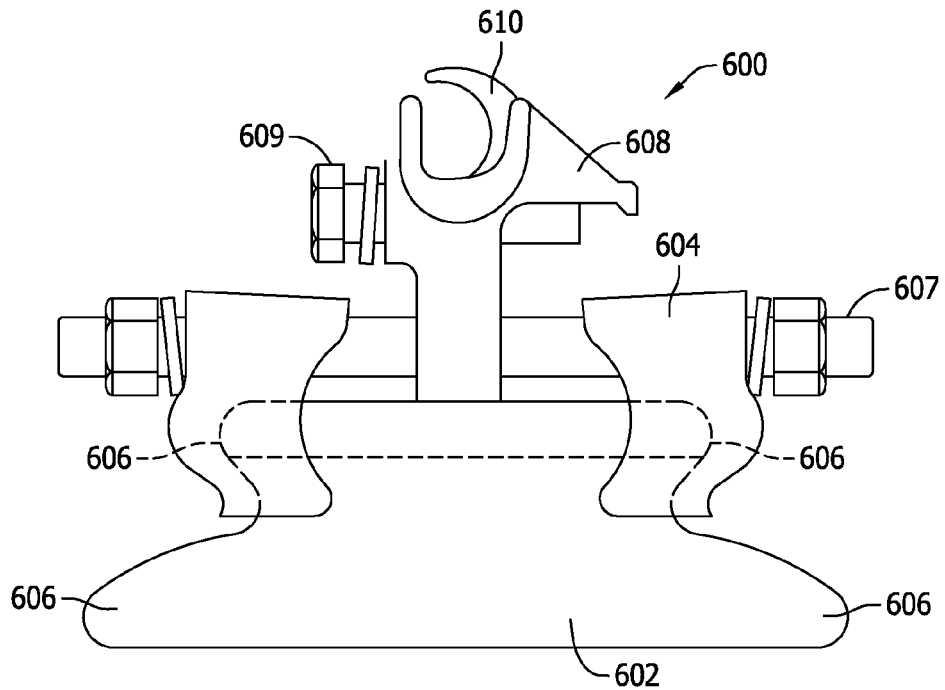
FIG. 6B is a front elevation view of clamp top type cable clamp device as installed on insulator.

FIG. 6A is a side elevation view of cover 100 installed on a clamp top type cable clamp device 600 as installed on an insulator 602. FIG. 6B is a front elevation view of clamp top type cable clamp device 600 as installed on insulator 602. Clamp device 600 includes an insulator clamp 604 configured to engage an insulator groove 605 of an upper fluke(s) 606 of insulator 602. An insulator clamp bolt 607 facilitates securing clamp device 600 to insulator 602. Clamp device 600 includes a cable clamp 608 configured to engage a cable and secured by a cable clamp bolt 609. A keeper 610 is configured to maintain cable engaged to clamp device 600. Keeper 610 may be reversible to facilitate accommodating different sizes of cables. A saddle 612 supports the cable and provides a surface for keeper 610 to clamp the cable to. Cover 100 is positioned over clamp top type cable clamp device 600 such that cable clamp 608 extends into and is accommodated by first cylindrically shaped portion 114 and, second cylindrically shaped portion 116 of cable cavities 110 and 112, respectively. As described above, bolt cavity 154 and the expansion of dome 102 on side 502 are sized to accommodate insulator clamp bolt 607 and cable clamp bolt 609.

Figure 7:
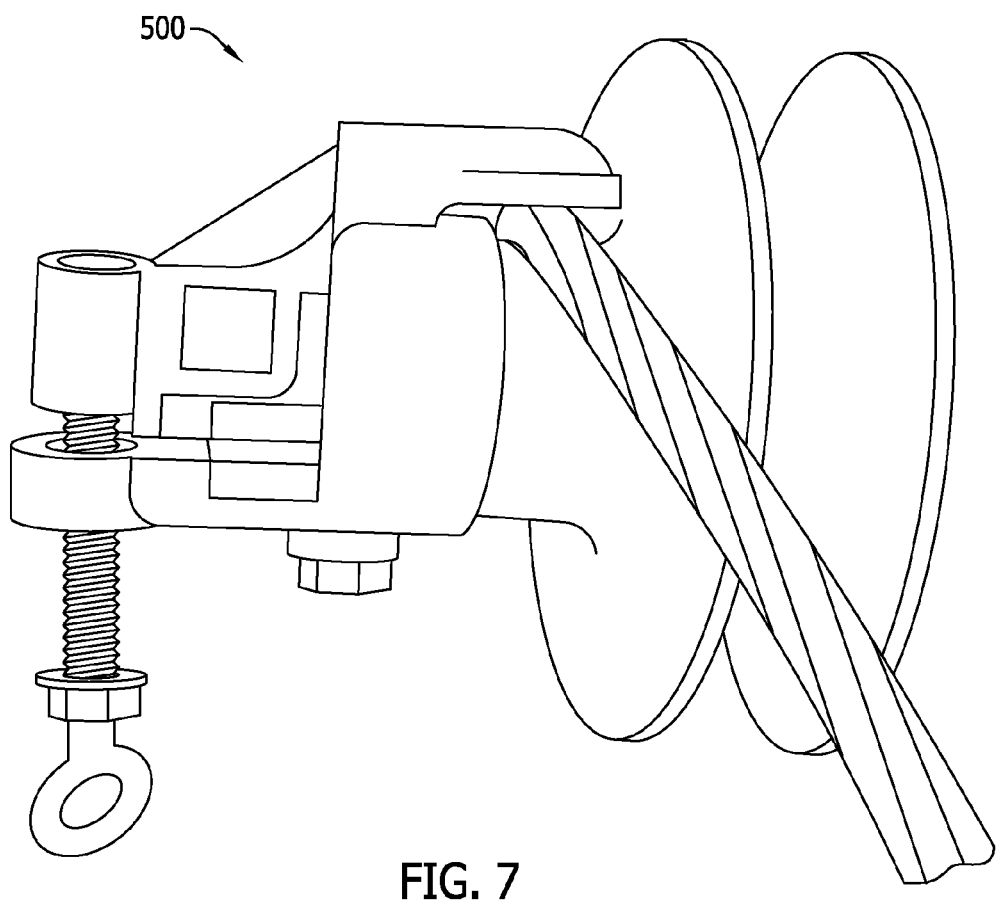

FIG. 7 is a side elevation view of vice top type insulator cable clamp device 500 mounted in a side projecting configuration rather than the vertical configuration shown in FIGS. 5A and 5B. A cable 700 is shown laid on a cable groove 702 and is retained in vice top type insulator cable clamp device 500 by vertical finger 504.

Figure 8:
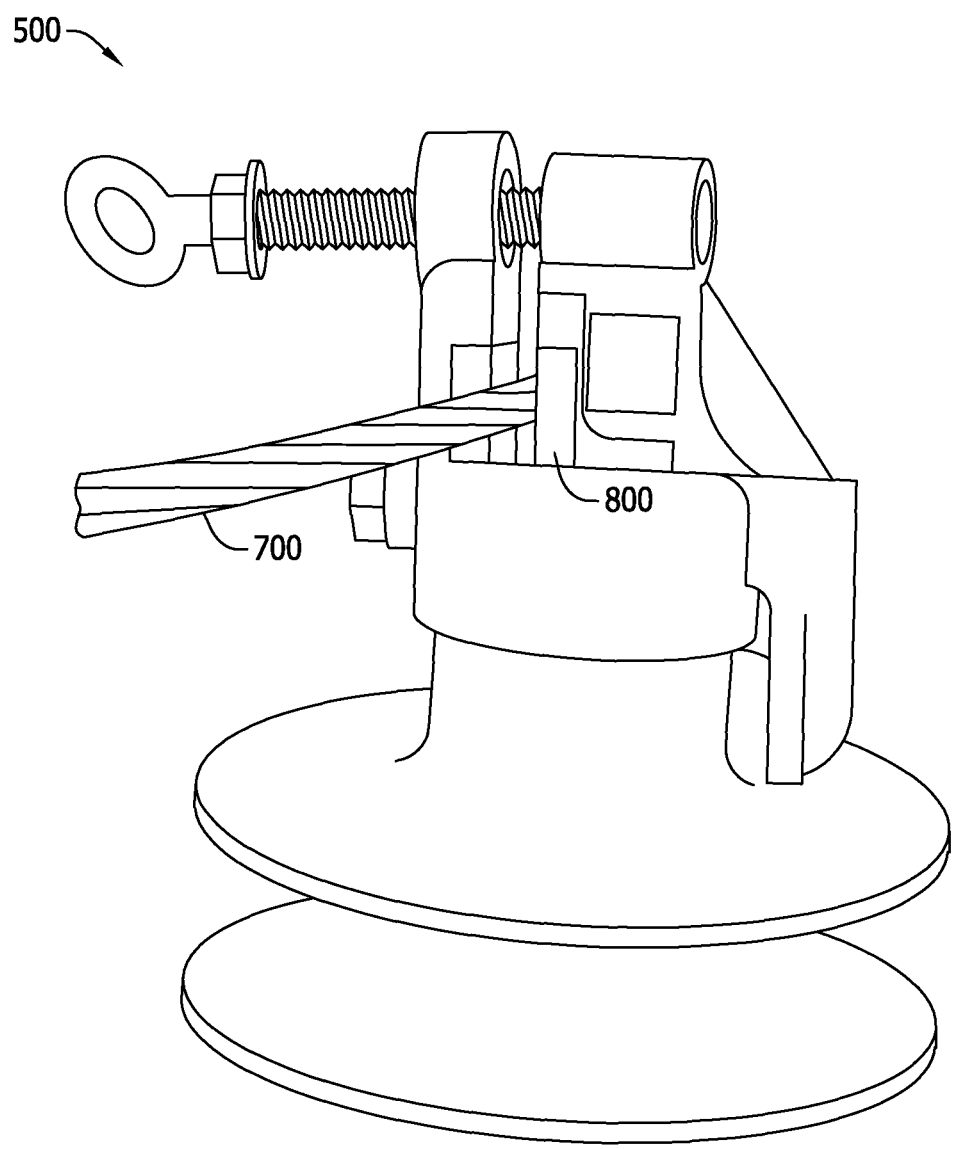

FIG. 8 is a perspective view of vice top type insulator cable clamp device 500 mounted in a vertical configuration. Cable 700 is shown in a vice clamp 800 and is retained in vice top type insulator cable clamp device 500 by vice clamp 800.

Figure 9:
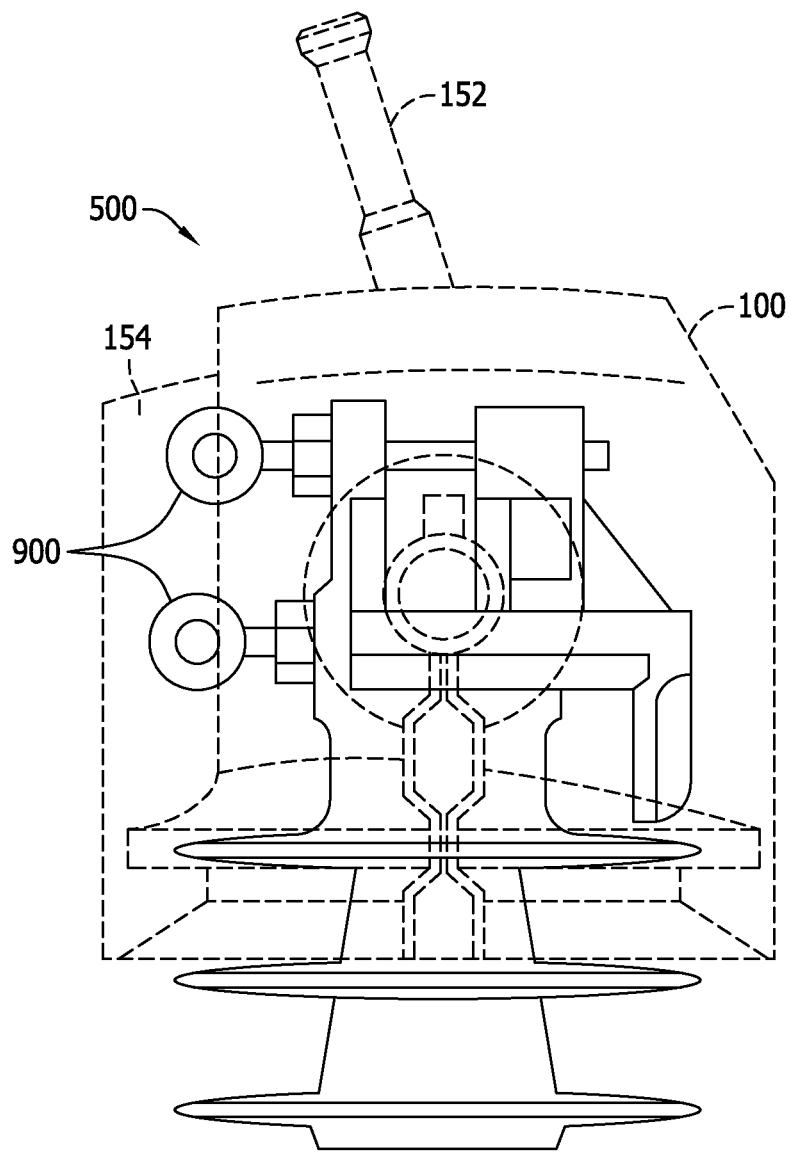

FIG. 9 is a side elevation view of vice top type insulator cable clamp device 500. Eyes 900 facilitate installation and operation of vice top type insulator cable clamp device 500 using a hotstick.

Figure 10:
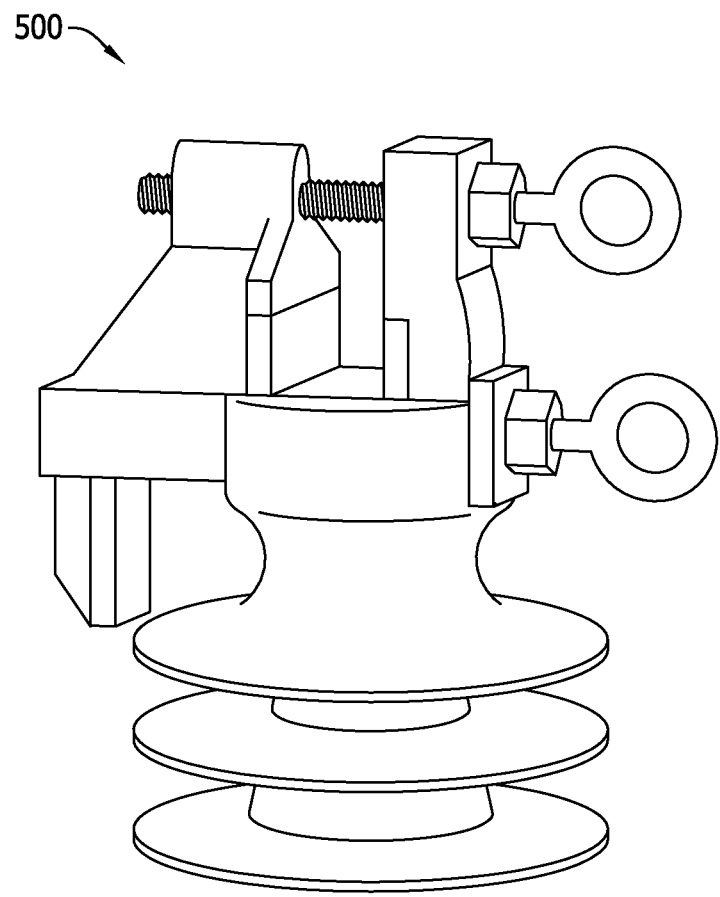

FIG. 10 is a perspective view of vice top type insulator cable clamp device 500.

The above-described embodiments of a method and system of electrical insulator covers provides a cost-effective and reliable means for reducing inventory of insulator covers. As a result, the methods and systems described herein facilitate managing electrical components in a cost-effective and reliable manner.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A monolithically-formed insulator cover configured to fit a plurality of different style insulator cable clamp devices, said cover comprising:

a dome configured to receive an insulator top;

a plurality of cable cavities that extend orthogonally away from said dome in opposite directions and configured to permit passage of a cable therethrough, said cable cavities include a first cylindrically shaped portion and a second cylindrically-shaped portion, first cylindrically shaped portion being larger than a diameter of said second cylindrically-shaped portion; and a lower extension that extends along a bottom edge of said cover from a distal end of said second cylindrically-shaped portion to a distal end of said oppositely extending second cylindrically-shaped portion, said lower extension is split parallel to said plurality of cable cavities to permit said insulator cover to be slid down over a fully assembled insulator and cable attachment, wherein said dome, said plurality of cable cavities, and said lower extension are integrally-formed.

2. The cover of claim 1, further comprising a plurality of flared cavities configured to receive flukes of a top portion of the insulator.

3. The cover of claim 1, further comprising a frusto-conically-shaped transition portion between said first cylindrically shaped portion and said second cylindrically-shaped portion.

4. The cover of claim 1, wherein said lower extension includes flared openings that extend outwardly to facilitate sliding cover over the cable.

5. The cover of claim 1, further comprising a clip cavity configured to receive a clip attached to the cable positioned at a distal end of second cylindrically-shaped portions.

6. The cover of claim 1, further comprising a hotstick knob extending upwardly from dome to permit a user to handle said cover using a hotstick.

7. The cover of claim 1, further comprising a bolt cavity configured to receive one or more cable clamp bolts used to clamp the cable into the insulator using the clamp top type cable clamp device.

8. The cover of claim 1, wherein said cover is formed of a flexible electrically insulative material.

9. The cover of claim 1, wherein said cover is formed of a high density polyethylene material.

* * * * *